US 9,856,824 B2

United States Patent
Lerg et al.

(10) Patent No.: US 9,856,824 B2
(45) Date of Patent: Jan. 2, 2018

(54) AIRCRAFT NOZZLE SYSTEM

(71) Applicant: Rolls-Royce North American Technologies, Inc., Indianapolis, IN (US)

(72) Inventors: Bryan H. Lerg, Westfield, IN (US); Stephen A. Bergeron, Indianapolis, IN (US); Benjamin R. Harding, Greenwood, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 628 days.

(21) Appl. No.: 14/199,612

(22) Filed: Mar. 6, 2014

(65) Prior Publication Data
US 2015/0121840 A1 May 7, 2015

Related U.S. Application Data

(60) Provisional application No. 61/774,268, filed on Mar. 7, 2013.

(51) Int. Cl.
*F02K 7/16* (2006.01)
*F02K 1/42* (2006.01)

(52) U.S. Cl.
CPC . *F02K 1/42* (2013.01); *F02K 7/16* (2013.01)

(58) Field of Classification Search
CPC ..... F02K 1/00; F02K 1/06; F02K 1/08; F02K 1/09; F02K 1/15; F02K 1/40; F02K 7/10; F02K 7/14; F02K 7/16; F02K 1/42
See application file for complete search history.

(56) References Cited

U.S. PATENT DOCUMENTS

| | | | | |
|---|---|---|---|---|
| 2,896,408 A | * | 7/1959 | O'Donnell | F02K 3/075 60/244 |
| 2,909,894 A | * | 10/1959 | O'Donnell | F02K 3/075 60/244 |
| 3,199,291 A | * | 8/1965 | Kelley | B64D 27/20 60/244 |
| 3,324,660 A | * | 6/1967 | Lane | F02C 7/042 60/244 |
| 4,919,364 A | * | 4/1990 | John | B64D 27/20 244/53 B |
| 5,094,070 A | | 3/1992 | Enderle | |
| 5,103,639 A | | 4/1992 | Wolf | |
| 5,165,227 A | | 11/1992 | Grieb | |
| 5,186,390 A | | 2/1993 | Enderle et al. | |
| 5,201,800 A | | 4/1993 | Wolf | |
| 5,284,014 A | | 2/1994 | Brossier et al. | |

(Continued)

*Primary Examiner* — William H Rodriguez
*Assistant Examiner* — Jason H Duger
(74) *Attorney, Agent, or Firm* — Barnes & Thornburg LLP

(57) ABSTRACT

A nozzle is provided that is capable providing flowpaths for a combined cycle aircraft propulsion system that in one form includes a gas turbine engine and a ramjet. The gas turbine engine produces an exhaust flow that is offset from an exhaust flow from the ramjet. The two streams can be flowed independent of each other or together depending on the application and relevant portion of a flight envelope. The nozzle includes a movable portion that can selectively open and close an exhaust flowpath for the gas turbine engine. The nozzle includes a surface that provides expansion for both low speed (gas turbine engine) flow and high speed (ramjet) flow.

13 Claims, 5 Drawing Sheets

(56) References Cited

U.S. PATENT DOCUMENTS

| | | | | |
|---|---|---|---|---|
| 5,347,807 A * | 9/1994 | Brossier | ............... | F02K 3/075 137/15.1 |
| 5,351,480 A * | 10/1994 | Kretschmer | ............ | F02K 1/09 239/265.11 |
| 5,694,768 A | 12/1997 | Johnson et al. | | |
| 5,970,705 A | 10/1999 | Scrace | | |
| 6,907,724 B2 * | 6/2005 | Edelman | ................. | F02K 7/16 60/225 |
| 7,137,255 B2 * | 11/2006 | Schmotolocha | ......... | F02K 3/10 60/761 |
| 7,174,704 B2 * | 2/2007 | Renggli | ................. | F02K 1/09 239/265.33 |
| 7,216,474 B2 * | 5/2007 | Bulman | ............... | B64C 30/00 244/53 B |
| 8,356,483 B2 * | 1/2013 | Petty | ...................... | F02K 1/06 239/265.17 |
| 2005/0081508 A1 | 4/2005 | Edelman et al. | | |

* cited by examiner

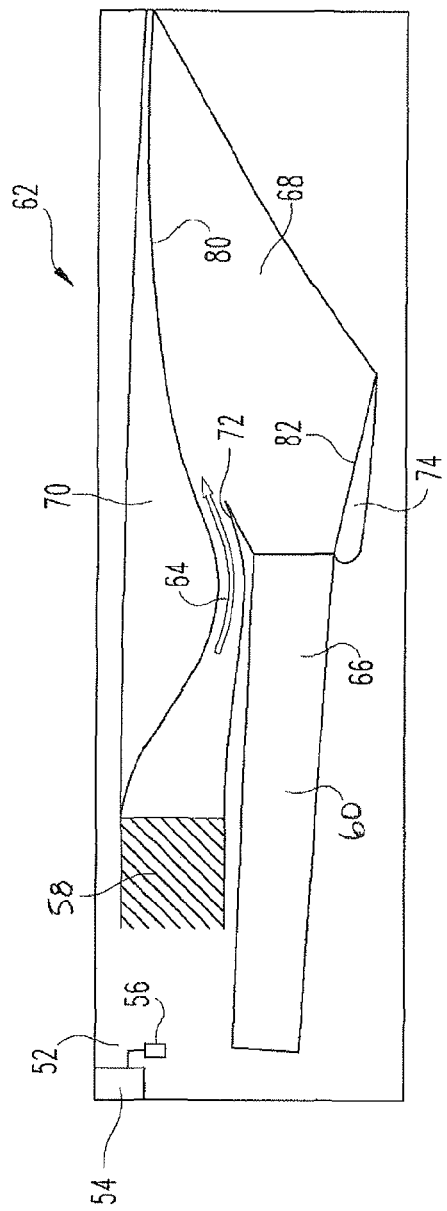
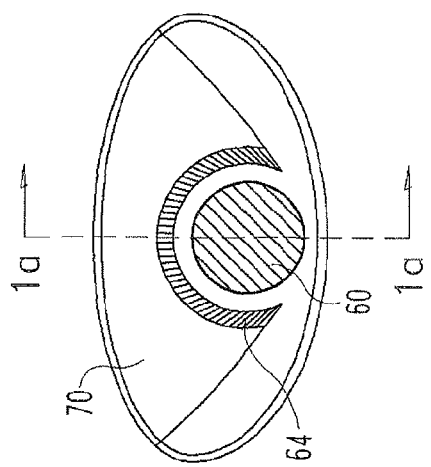

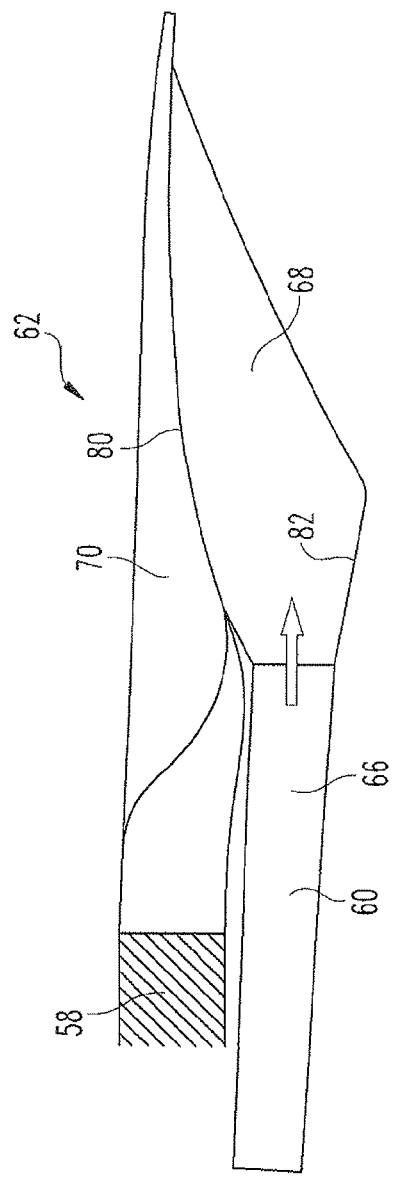
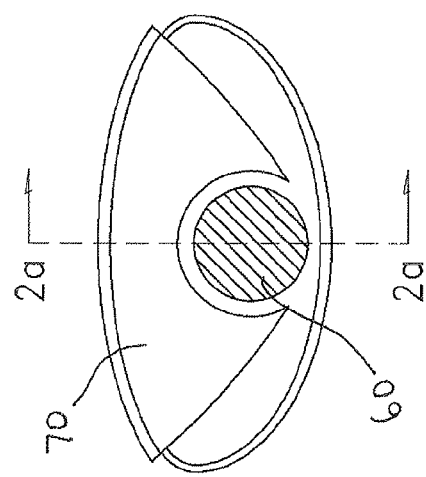
Fig. 2a
Fig. 2b

AIRCRAFT NOZZLE SYSTEM

CROSS REFERENCE TO RELATED APPLICATIONS

This application claims priority to and the benefit of U.S. Provisional Patent Application No. 61/774,268, filed 7 Mar. 2013, the disclosure of which is now expressly incorporated herein by reference.

GOVERNMENT RIGHTS

The present disclosure was made with U.S. Government support under contract number XG2458460E. The U.S. Government may have certain rights in the present disclosure.

TECHNICAL FIELD

The present disclosure generally relates to aircraft engines. More particularly, but not exclusively, the present disclosure relates to combined cycle engines.

BACKGROUND

Providing variable flowpaths for combined cycle engine exhaust streams remains an area of interest. Some existing systems have various shortcomings relative to certain applications. Accordingly, there remains a need for further contributions in this area of technology.

SUMMARY

One embodiment of the present disclosure is a unique nozzle for an aircraft combined cycle engine system. Other embodiments include apparatuses, systems, devices, hardware, methods, and combinations for merging and closing exhaust flows from a combined cycle engine system. Further embodiments, forms, features, aspects, benefits, and advantages of the present application shall become apparent from the description and figures provided herewith.

BRIEF DESCRIPTION OF THE FIGURES

FIG. 1a depicts a side view of one embodiment of the present application along line 1a of FIG. 1b;

FIG. 1b depicts a rear view of one embodiment of the present application;

FIG. 2a depicts a side view of one embodiment of the present application along line 2a of FIG. 2b;

FIG. 2b depicts a rear view of one embodiment of the present application;

DETAILED DESCRIPTION OF THE ILLUSTRATIVE EMBODIMENTS

Figure 3:
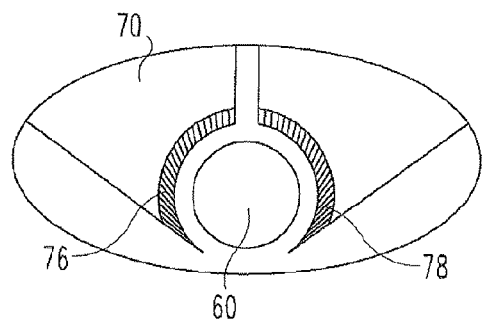
FIG. 3 depicts one embodiment of the present application.

For the purposes of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates.

With reference to FIGS. 1a and 1b, there is illustrated one form of an aircraft engine 50 used as a powerplant for an aircraft 52. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. The aircraft 52 may operate at a variety of speeds and includes a sensor 54 and controller 56.

The sensor 54 detects aircraft flight condition such as speed and altitude, to set forth just two non-limiting examples, and can output any variety of data whether sensed or calculated. For example, the sensor 54 can sense and output conditions such as static temperature, static pressure, total temperature, and/or total pressure, among possible others. In addition, the flight condition sensor 54 can output calculated values such as, but not limited to, equivalent airspeed, altitude, and Mach number. Any number of other sensed conditions or calculated values can also be output. The flight condition sensor 54 provides data to the controller 56 and can output values in either analog or digital form.

The controller 56 is provided to monitor and control engine operations. The controller 56 can be comprised of digital circuitry, analog circuitry, or a hybrid combination of both of these types. Also, the controller 56 can be programmable, an integrated state machine, or a hybrid combination thereof. The controller 56 can include one or more Arithmetic Logic Units (ALUs), Central Processing Units (CPUs), memories, limiters, conditioners, filters, format converters, or the like which are not shown to preserve clarity. In one form, the controller 56 is of a programmable variety that executes algorithms and processes data in accordance with operating logic that is defined by programming instructions (such as software or firmware). Alternatively or additionally, operating logic for the controller 56 can be at least partially defined by hardwired logic or other hardware. In one particular form, the controller 56 is configured to operate as a Full Authority Digital Engine Control (FADEC); however, in other embodiments it may be organized/configured in a different manner as would occur to those skilled in the art.

The aircraft engine 50 includes a gas turbine engine 58 and a ramjet 60, both capable of providing propulsive force for the aircraft 52 by exhausting a high speed jet through a nozzle 62. A side view of the aircraft engine 50 can be seen in FIG. 1a and a front view can be seen in FIG. 1b. The gas turbine engine 58 and the ramjet 60 can be operated separately or simultaneously. The engines can also be operated independent of each other. The gas turbine engine 58 can take a variety of forms such as a turbojet or a turbofan and additionally can include multiple spools. In some forms the gas turbine engine 58 can be an adaptive or variable cycle engine. The ramjet 60 provides compression to a working fluid, such as air, through the combination of a forward speed of the aircraft 52 and the configuration of an inlet that supplies the working fluid to the ramjet 60. The ramjet 60 can include a subsonic combustor or, in some situations, a supersonic combustor, which can sometimes be referred to as a scramjet.

The nozzle 62 includes multiple flowpaths useful for discharging a high speed jet produced by either the gas turbine engine 58 or ramjet 60, or combination thereof. The nozzle 62 includes a turbine engine flowpath 64, a ramjet flowpath 66, and a powerplant discharge flowpath 68 which is operable to accept an exhaust flow from either or both the gas turbine engine 58 or ramjet 60. The nozzle 62 includes a movable portion 70 capable of having its position changed to affect a change in at least the turbine engine flowpath 64. In one form the movable portion 70 is capable of having its downstream edge move axially. For example, the movable portion 70 can be capable of sliding fore and aft to change the turbine engine flowpath 64. In the illustrative form the movable portion 70 can be slid to a fore position to relatively open the turbine engine flowpath 64, and can be slid to an aft position to relatively close the turbine engine flowpath 64. The translation plane of the movable portion 70 can be parallel to the ramjet flowpath 66 to avoid mechanical complexity. In some forms, however, the movable portion 70 can also change positions/orientations using movements other than strictly sliding fore and aft, such as a combined sliding and rotating to set forth just one non-limiting example. Though the movable portion 70 is depicted as a unitary structure in the illustrative embodiment, in some embodiments the movable portion 70 can be an assembly of parts, such as an assembly of two or more movable portions. FIGS. 1a and 1b illustrate a position of the movable portion 70 in which the turbine engine flowpath 64 is open. FIGS. 2a and 2b, in contrast, illustrate a position of the movable portion 70 in which the turbine engine flowpath 64 is closed.

The nozzle 62 also includes an upper nozzle surface 80 and a lower nozzle surface 82. As used herein, the terms "upper" and "lower", as well as any other spatial designation, are used for ease of reference in the drawings as depicted and is not intended to limit how the aircraft engine 50 is to be operated and/or integrated into an aircraft 52. Depending on the mode of operation (to be described more fully below), the upper nozzle surface 80 can form a flowpath surface for either the turbine engine flowpath 64 or the ramjet flowpath 66. In the illustrative embodiment the upper nozzle surface 80 is part of the movable portion 70. The lower nozzle surface 82 forms part of the flowpath surface for the ramjet flowpath 66. Depending on the size and relative location of the lower nozzle surface 82, in some embodiments the lower nozzle surface 82 can influence the turbine engine flowpath 64.

The moveable portion 70 engages an engine structure 72 to close the turbine engine flowpath 64. The engine structure 72 can be a relatively fixed structure oriented to define the turbine engine flowpath 64. In some forms, however, the engine structure 72 can include a portion or portions that are capable of movement. In still further forms, the engine structure 72 may be capable of movements similar to the movable portion 70 while the movable portion 70 is relatively fixed. For example, the engine structure 72 can be capable of moving axially to selectively open and close the turbine engine flowpath 64. The distance between the engine structure 72 and the movable portion 70 can create a throat and exit, as will be discussed in more detail below.

As can be seen in FIG. 1b the turbine engine flowpath includes a semi-annular shape radially outward of the ramjet 60. Shapes other than semi-annular are also contemplated herein. To set forth just one non-limiting example, FIG. 3 depicts one form of the turbine engine flowpath 64 that includes two separate exits 76 and 78. The exits 76 and 78 can represent a single turbine engine flowpath 64 that has been bifurcated at the exit, or alternatively can represent separate turbine engine flowpaths for multiple gas turbine engines. Other variations are also contemplated herein.

In some embodiments the nozzle 62 can also include a nozzle structure 74, as depicted in FIG. 1a. The nozzle structure 74 can be fixed in some embodiments, but can also be moved in others. For example, the nozzle structure 74 can be rotated and/or translated in some embodiments to provide for additional variability in the nozzle 62.

Turning now to FIGS. 2a and 2b, the movable portion 70 is illustrated in an operating position that closes the turbine engine flowpath 64. In the illustrative form the movable portion 70 is translated axially fore such that the movable portion 70 is in sufficient proximity to the engine structure 72 to effectively close off the turbine engine flowpath 64.

Figure 4:
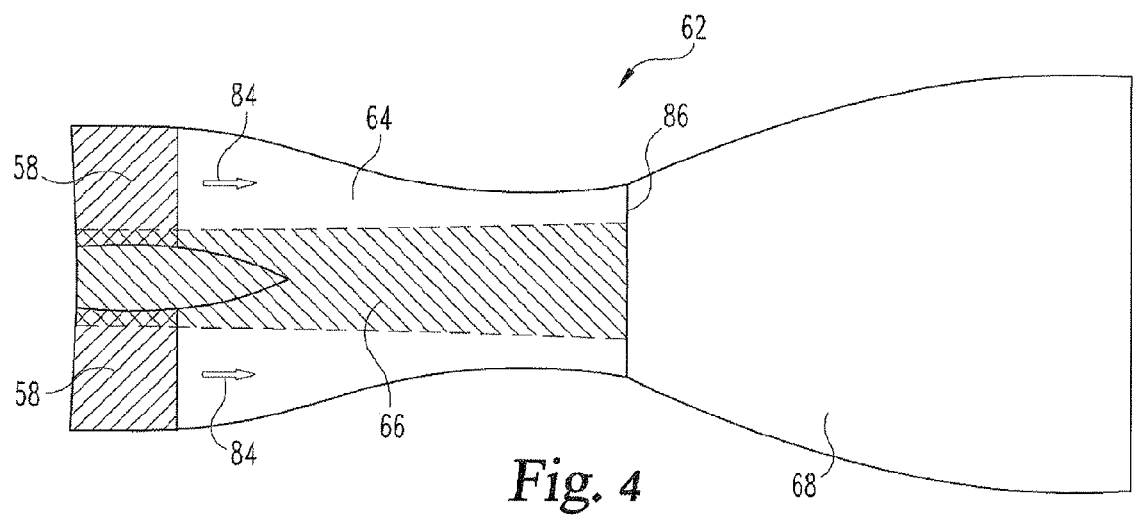
FIG. 4 depicts one embodiment of the present application.

FIG. 4 depicts a top view of one embodiment of the nozzle 62. Two gas turbine engines 58 each produce exhaust streams 84 that merge in the turbine engine flowpath 64 prior to being discharged through an exit 86 into the powerplant discharge flowpath 68. The gas turbine engines 58 can be operated either independent of each other or slaved together. In some applications the gas turbine engines 58 can take different forms if desired. The merged exhaust streams 84 can merge at a variety of distances upstream of the exit 86 depending on the needs of any given application. The ramjet flowpath 66 is depicted in cross section and is located beneath the turbine engine flowpath 64, similar to the depiction in FIGS. 1a and 1b. The ramjet flowpath 66 can discharge an exhaust flow from the ramjet 60 into the powerplant discharge flowpath 68 when the ramjet 60 is operated. In some embodiments of the present application the ramjet 60 may permit throughflow of a working fluid whether or not a combustion is occurring in the ramjet 60.

Figure 5:
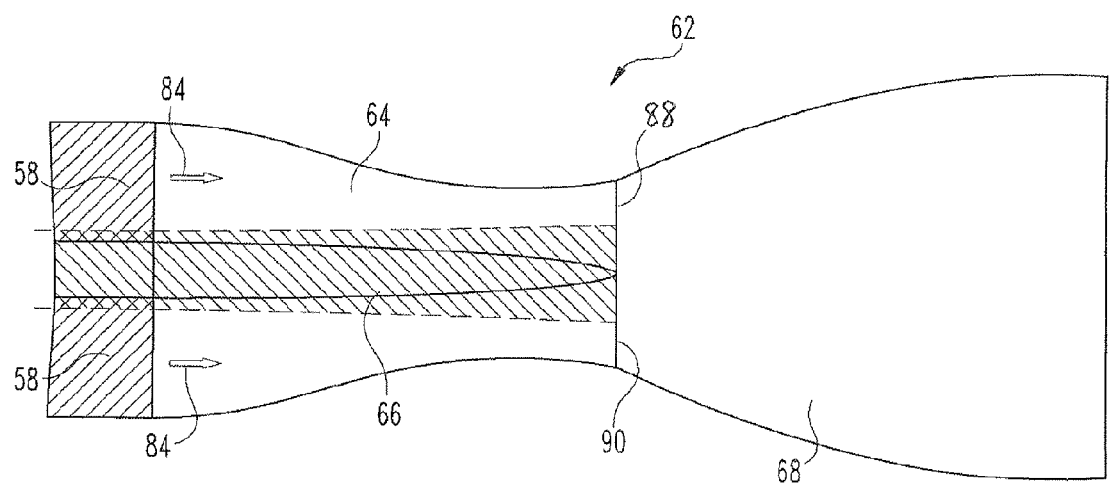
FIG. 5 depicts one embodiment of the present application.

FIG. 5 depicts a top view of yet another embodiment of the nozzle 62. Two gas turbine engines 58 each produce exhaust streams 84 that are maintained as separate flow streams each having their own exits 88 and 90 which discharge into the powerplant discharge flowpath 68, similar to the embodiment depicted in FIG. 3. The ramjet flowpath 66 is depicted in cross section and is located beneath the turbine engine flowpath 64, similar to the depiction in FIGS. 1a and 1b. The ramjet flowpath 66 can discharge an exhaust flow from the ramjet 60 into the powerplant discharge flowpath 68 when the ramjet 60 is operated. In some embodiments of the present application the ramjet 60 may permit throughflow of a working fluid whether or not a combustion is occurring in the ramjet 60.

Figure 6:
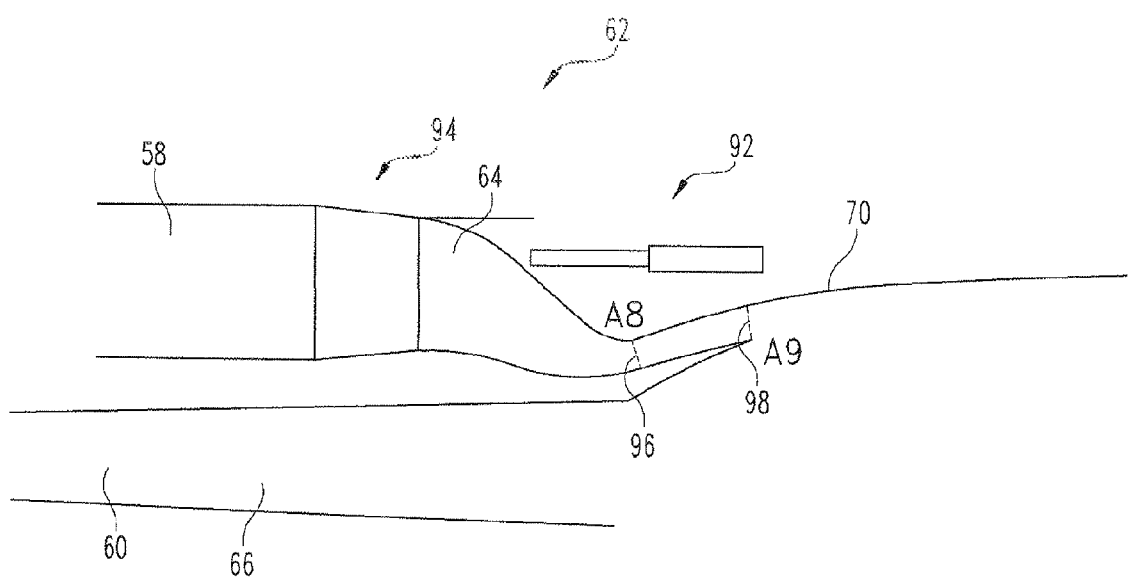
FIG. 6 depicts one embodiment of the present application.
Figure 7:
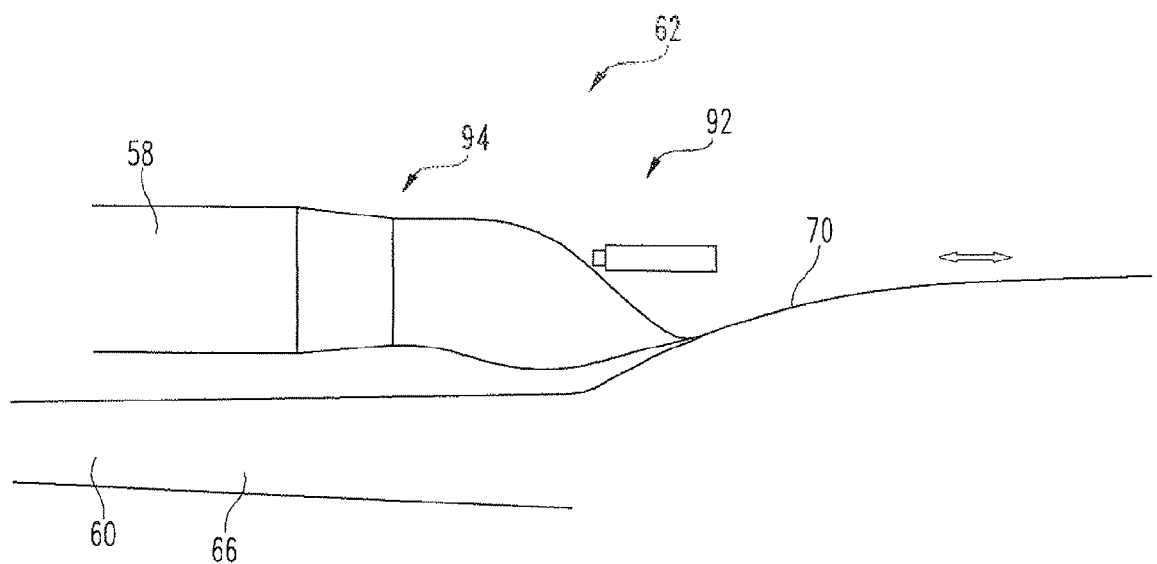
FIG. 7 depicts one embodiment of the present application.

Turning now to FIGS. 6 and 7, one form of the nozzle 62 is shown in greater detail, and in particular depicts one non-limiting mechanism for providing movement to the movable portion 70. An actuator 92 is coupled with the movable portion 70 that, in the illustrative form, acts to translate the movable portion 70 axially. The actuator 92 can be capable of moving the movable portion 70 to different positions at a variety of rates. In some forms the actuator 92 can be a device that moves the movable portion 70 to a discrete number of positions. For example, the actuator 92 can move the movable portion 70 between an open position and a closed position only, to set forth just one non-limiting possibility.

A static duct 94 is depicted in FIGS. 6 and 7. Some forms of the instant application can include a static duct 94 disposed between the gas turbine engine 58 and the turbine engine flowpath 64, while other forms may not include the static duct 94.

FIGS. 6 and 7 also depict the throat area 96, sometimes referred to as A8, and the exit area 98, sometimes referred to as A9. The throat area 96 and/or the exit area 98 can change locations and/or values depending on the location of the movable portion 70.

During operation of the aircraft engine 50, the gas turbine engine 58 is used to provide propulsive power for the aircraft 52 at relatively low speeds. As the aircraft is accelerated to relatively high speeds the ramjet 60 can be started to provide additional and/or alternative propulsive force. The movable portion 70 can be moved, such as through an actuation system, to close off an exhaust flowpath for the gas turbine engine 50 so that the engine can be shut down. The movable portion 70 allows the gas turbine engine 50 to be cocooned.

In one aspect the present application provides an apparatus comprising an aircraft engine having a gas turbine engine and a ramjet, an aircraft nozzle structure providing an exhaust flowpath for the gas turbine engine and an exhaust flowpath for the ramjet, the aircraft nozzle structure including an axially adjustable portion having a flowpath surface operable to cooperate with a portion of the aircraft nozzle structure to reduce an exit of the gas turbine engine, and wherein the exhaust flowpath for the gas turbine engine and the exhaust flowpath for the ramjet merge downstream of the flowpath surface of the axially adjustable portion.

In another aspect the present application provides an apparatus comprising an aircraft having a combined cycle powerplant that includes a gas turbine engine operable to provide propulsive power in a first configuration and having a gas turbine engine centerline, a ramjet operable to provide propulsive power in a second configuration and having a ramjet centerline offset from the gas turbine engine centerline, and a nozzle having a moveable nozzle assembly operable to vary an exhaust pathway for the gas turbine engine, the movable nozzle assembly having a convergent upstream portion forming a flowpath surface for the gas turbine engine in the first configuration, the nozzle also having a divergent portion downstream of the convergent upstream portion that permits an expansion of an exhaust flow for the combined cycle powerplant.

In yet another aspect the present application provides an apparatus comprising an aircraft engine having a ramjet combustor producing a ramjet exhaust flow and a gas turbine engine combustor producing a turbine engine exhaust flow, an aircraft nozzle having a dual flowpath structured to receive the ramjet exhaust flow and the turbine engine exhaust flow, and means for changing the dual flowpath configuration of the aircraft nozzle, the means operable to provide the turbine engine exhaust flow through the aircraft nozzle in a first state and the ramjet exhaust in a second state.

In still a further aspect of the present application provides a method comprising generating propulsive power from an aircraft powerplant having a gas turbine engine and a ramjet by exhausting a powerplant flow out of a nozzle, flowing an exhaust flow from the gas turbine engine along a movable nozzle structure, and closing an exit of the gas turbine engine by axially translating an end of the movable nozzle structure.

While the invention has been illustrated and described in detail in the drawings and foregoing description, the same is to be considered as illustrative and not restrictive in character, it being understood that only the preferred embodiments have been shown and described and that all changes and modifications that come within the spirit of the disclosure are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
an aircraft having a combined cycle powerplant and the combined cycle powerplant includes:
a gas turbine engine operable to provide propulsive power in a first configuration and having a gas turbine engine centerline;
a ramjet operable to provide propulsive power in a second configuration and having a ramjet centerline offset from the gas turbine engine centerline;
an engine partition structure located between the gas turbine engine and the ramjet and oriented to define part of a flowpath of the gas turbine engine, the engine partition structure being fixed relative to the gas turbine engine centerline; and
a nozzle having a movable nozzle assembly, the movable nozzle assembly configured to translate axially relative to the gas turbine engine centerline to vary an exhaust of the flowpath of the gas turbine engine, the movable nozzle assembly having a convergent upstream portion forming a surface of the flowpath of the gas turbine engine in the first configuration, the movable nozzle assembly also having a divergent portion downstream of the convergent upstream portion that permits an expansion of an exhaust flow for the combined cycle powerplant,
wherein the convergent upstream portion of the movable nozzle assembly moves relative to the engine partition structure and cooperates with the engine partition structure to open and close the exhaust of the flowpath of the gas turbine engine.

2. The apparatus of claim 1, wherein the combined cycle powerplant is capable of operating the gas turbine engine and the ramjet at the same time.

3. The apparatus of claim 2, wherein the divergent portion of the movable nozzle assembly forms part of the flowpath of the gas turbine engine in the first configuration.

4. The apparatus of claim 1, wherein the divergent portion of the movable nozzle assembly forms part of the flowpath of the gas turbine engine in the first configuration, and forms a flowpath for the ramjet in the second configuration when the movable nozzle assembly is operated to close the exhaust of the flowpath of the gas turbine engine.

5. The apparatus of claim 1, which further includes a linear actuator coupled with the movable nozzle assembly, wherein the linear actuator is capable of producing an axial movement of the movable nozzle assembly to cause the movable nozzle assembly to translate axially relative to the gas turbine engine centerline.

6. The apparatus of claim 1, wherein an exit of the gas turbine engine is partially annular and extends around less than a periphery of an exit of the ramjet.

7. The apparatus of claim 1, wherein the convergent upstream portion is curvilinear.

8. The apparatus of claim 7, wherein the divergent portion is curvilinear.

9. The apparatus of claim 8, wherein the movable nozzle assembly is a unitary structure such that the convergent upstream portion and the divergent portion remain fixed relative to one another during movement of the movable nozzle assembly.

10. The apparatus of claim 1, wherein the movable nozzle assembly is a partially annular shape.

11. A method of operating the apparatus of claim 1 comprising:
   generating propulsive power from the combined cycle powerplant by exhausting the exhaust flow out of the nozzle;
   flowing a gas turbine engine exhaust flow from the gas turbine engine along the movable nozzle assembly; and
   closing the exhaust of the flowpath of the gas turbine engine by axially translating the movable nozzle assembly.

12. The method of claim 11, which further includes generating a ramjet exhaust flow from the ramjet, the exhaust flow out of the nozzle including the gas turbine engine exhaust flow from the gas turbine engine and the ramjet exhaust flow from the ramjet.

13. The method of claim 12, wherein the closing includes engaging the convergent upstream portion of the movable nozzle assembly with the engine partition structure to substantially close off the exhaust of the flowpath of the gas turbine engine.

* * * * *